United States Patent
Jones et al.

(10) Patent No.: US 10,922,638 B2
(45) Date of Patent: Feb. 16, 2021

(54) METHODS AND SYSTEMS FOR PRIORITIZING RETRIEVAL OF PRODUCTS FROM STOCK ROOM BINS

(71) Applicant: Walmart Apollo, LLC, Bentonville, AR (US)

(72) Inventors: Nicholaus A. Jones, Fayetteville, AR (US); Robert J. Taylor, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 510 days.

(21) Appl. No.: 15/342,399

(22) Filed: Nov. 3, 2016

(65) Prior Publication Data
US 2017/0132550 A1    May 11, 2017

Related U.S. Application Data

(60) Provisional application No. 62/251,328, filed on Nov. 5, 2015.

(51) Int. Cl.
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC ...... G06Q 10/087; G06Q 10/08; G06Q 50/00; G06Q 10/06315; G06G 1/14
See application file for complete search history.

(56) References Cited

U.S. PATENT DOCUMENTS

| | | | |
|---|---|---|---|
| 6,550,674 B1 | 4/2003 | Neumark | |
| 7,889,082 B2 | 2/2011 | Bauchot | |
| 8,175,925 B1 * | 5/2012 | Rouaix | G06Q 20/203 705/22 |
| 8,311,875 B1 | 11/2012 | Lloyd | |
| 2004/0054634 A1 | 3/2004 | Tak | |

(Continued)

OTHER PUBLICATIONS

How RFID Benefits Retail Fashion, Louis Sirico, Published May 2011 https://www.youtube.com/watch?v=4eOr0PfwFgs (Year: 2011).*

(Continued)

*Primary Examiner* — Patricia H Munson
*Assistant Examiner* — Thea Labogin
(74) *Attorney, Agent, or Firm* — Fitch, Even, Tabin & Flannery, LLP

(57) ABSTRACT

In some embodiments, methods and systems of prioritizing retrieval of products from a plurality of bins at a retail sales facility are described. The methods include receiving an identification of a product being binned at a retail sales facility, then determining the size of the product, and then ranking the products in the bins based on the time stamp of a time of binning of the product. The physical size of the product and the ranking of the product are correlated to a size of the bins to determine the relative physical locations of the products in the bins. A pick of a product from a bin is generated based on a determination that the location of the product to be picked in one of the bins is higher than a location of at least one identical product in at least another one of the bins.

10 Claims, 4 Drawing Sheets

(56) References Cited

U.S. PATENT DOCUMENTS

| | | | |
|---|---|---|---|
| 2008/0255968 A1 | 10/2008 | Heinrichs | |
| 2010/0030667 A1* | 2/2010 | Chudy | G06F 19/3462 |
| | | | 705/28 |
| 2011/0200420 A1 | 8/2011 | Driskill | |
| 2012/0144334 A1* | 6/2012 | Reichert | G06Q 10/087 |
| | | | 715/771 |
| 2014/0136255 A1* | 5/2014 | Grabovski | G06Q 10/063112 |
| | | | 705/7.14 |
| 2014/0324491 A1* | 10/2014 | Banks | G06Q 10/087 |
| | | | 705/7.12 |
| 2014/0327524 A1* | 11/2014 | Jones | G06K 7/10108 |
| | | | 340/10.42 |

OTHER PUBLICATIONS

RFID Refrigerator Enhancement , Published by UT Dallas, Dec. 2011 https://www.youtube.com/watch?v=yxZzG-Sh15U (Year: 2011).*
Bowman, et al.; "Sensor Based Condition Monitoring"; Building Radio Frequency Identification for the Global Environment (BRIDGE); Jun. 2009; pp. 1-95.

* cited by examiner

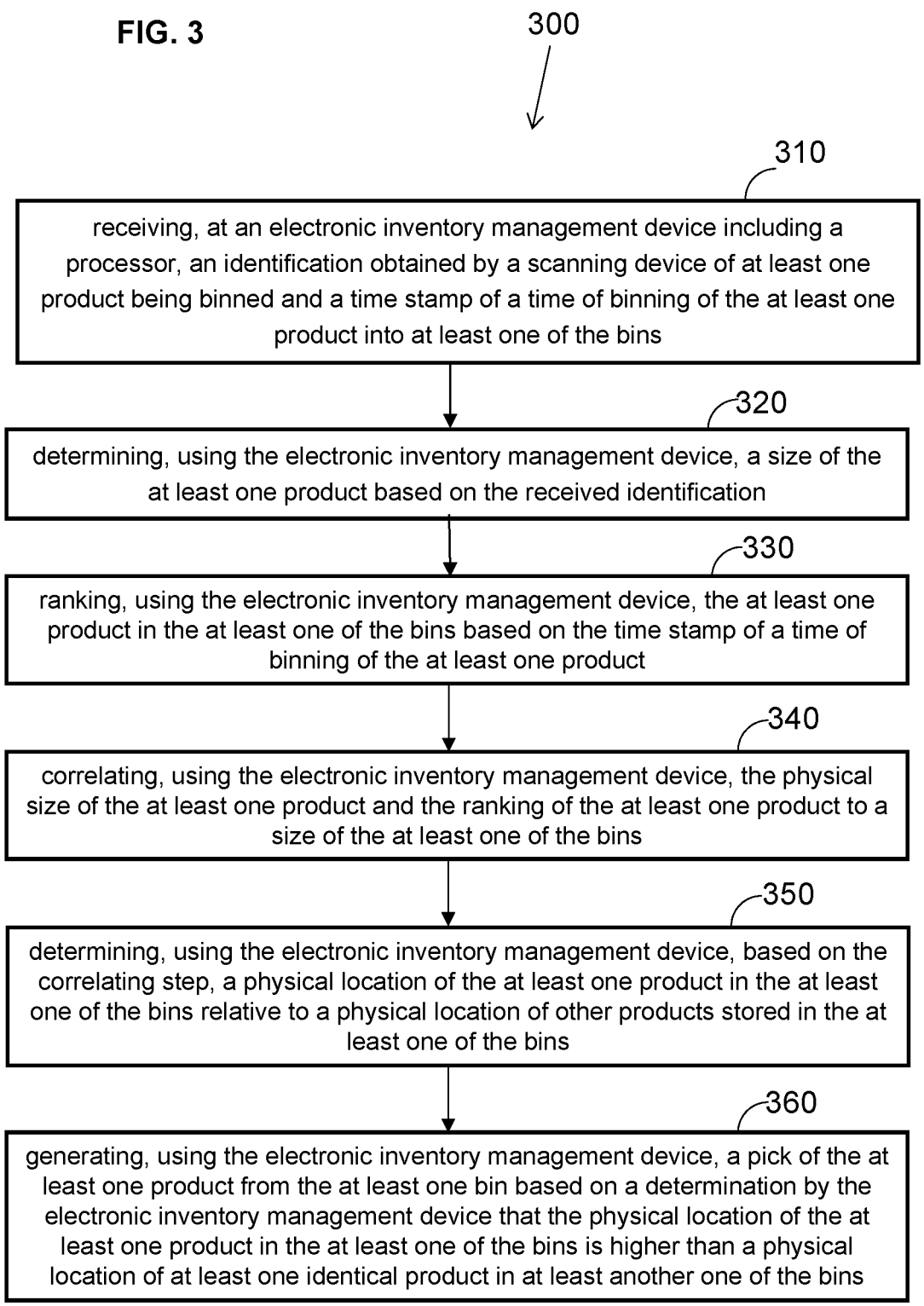

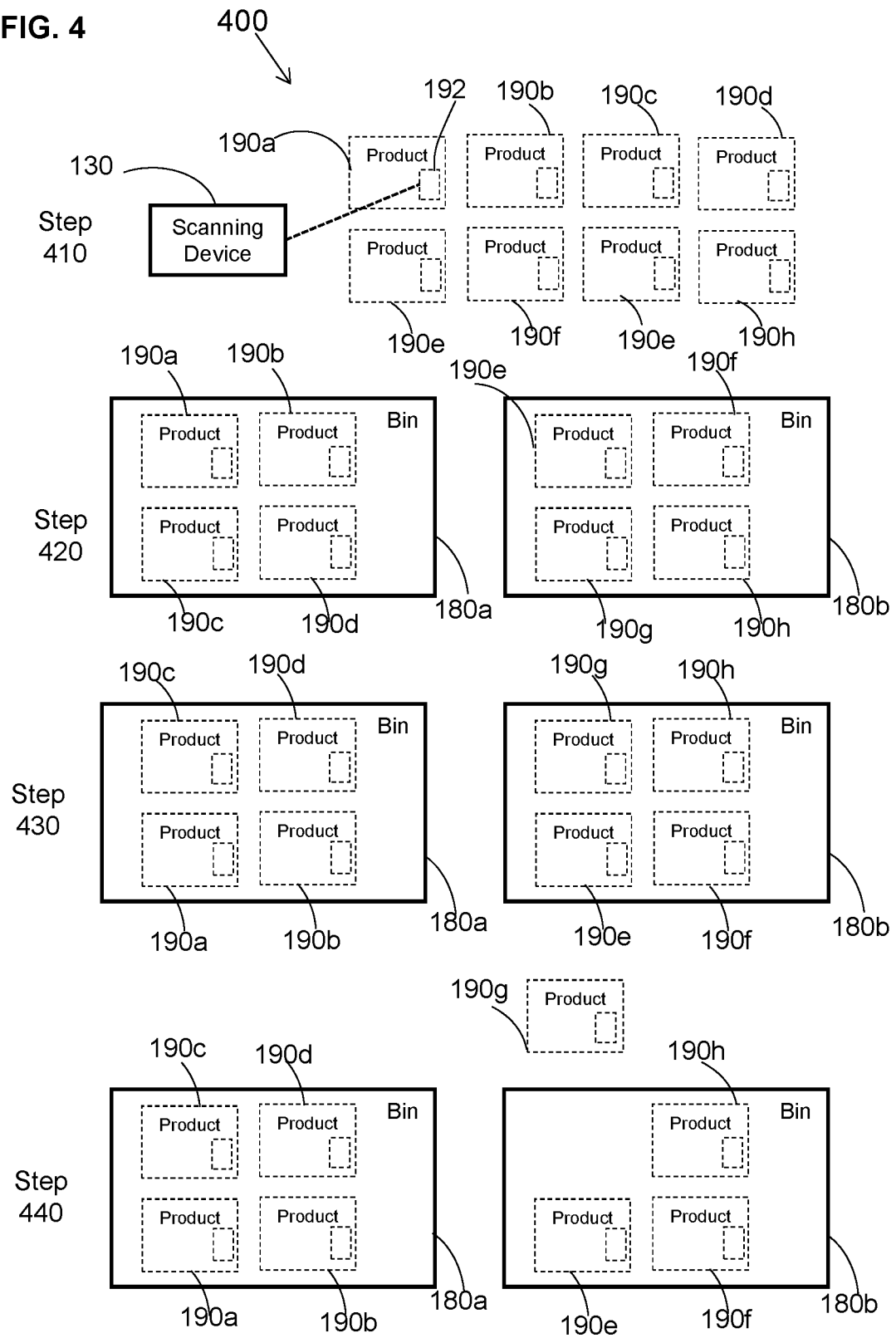

METHODS AND SYSTEMS FOR PRIORITIZING RETRIEVAL OF PRODUCTS FROM STOCK ROOM BINS

RELATED APPLICATIONS

This application claims the benefit of U.S. Provisional Application No. 62/251,328, filed Nov. 5, 2015, which is incorporated herein by reference in its entirety.

TECHNICAL FIELD

This invention relates generally to managing overstock inventory at retail sales facilities and, in particular, to systems and methods for prioritizing retrieval of products from storage bins at retail sales facilities.

BACKGROUND

Retail sales facilities such as large department stores store overstock products in storage bins in stock rooms. The storage bins are typically packed, often from bottom to top, with the products. Typically, the products that were placed into a storage bin earlier closer to the bottom of the bin than products that were placed into the storage bin later, with the latter products being closer to the top of the bin. Generally, when a pick from a storage bin for a product in the stock room is generated, a stock room associate goes to a storage bin known to contain the product being picked and attempts to retrieve the product for which the pick was generated from the storage bin.

While conventional inventory management systems can identify the storage bin where a product being picked is located, the conventional systems do not monitor the relative physical location of the products in the storage bins, and do not inform the stock room associate whether the product to be picked is at the bottom of a storage bin or at the top of the storage bin. As such, if two (or more) overstock units of an identical product are located in two (or more) different storage bins in the stock room, the conventional systems do not inform the stocking associate which of these two units may be picked easier from its respective storage bin as a result of the product being located at or near the top of the respective storage bin.

Accordingly, in conventional systems, the stocking associates may be directed to pick a product from a storage bin where the product being picked is at the bottom and is covered by one or more other products. This causes the stocking associates to spend more time retrieving this product from the storage bins when picking the products than would have been spent by the stocking associates if the stocking associates were directed by the system to retrieve the product from a bin where this product is at the top and is not covered by other products. As such, conventional inventory management systems are susceptible to inefficient use of the stock room associates' time during the picking of the products from the storage bins in the stock room.

BRIEF DESCRIPTION OF THE DRAWINGS

Disclosed herein are embodiments of systems, apparatuses and methods pertaining to methods and systems for retrieval of overstock products from stock room bins. This description includes drawings, wherein:

FIG. 3 is a flow chart diagram of a process of prioritizing retrieval of products from stock room bins at a retail sales facility in accordance with some embodiments.

FIG. 4 is a flow diagram of a method of prioritizing retrieval of products from stock room bins at a retail sales facility in accordance with some embodiments.

Figure 1:
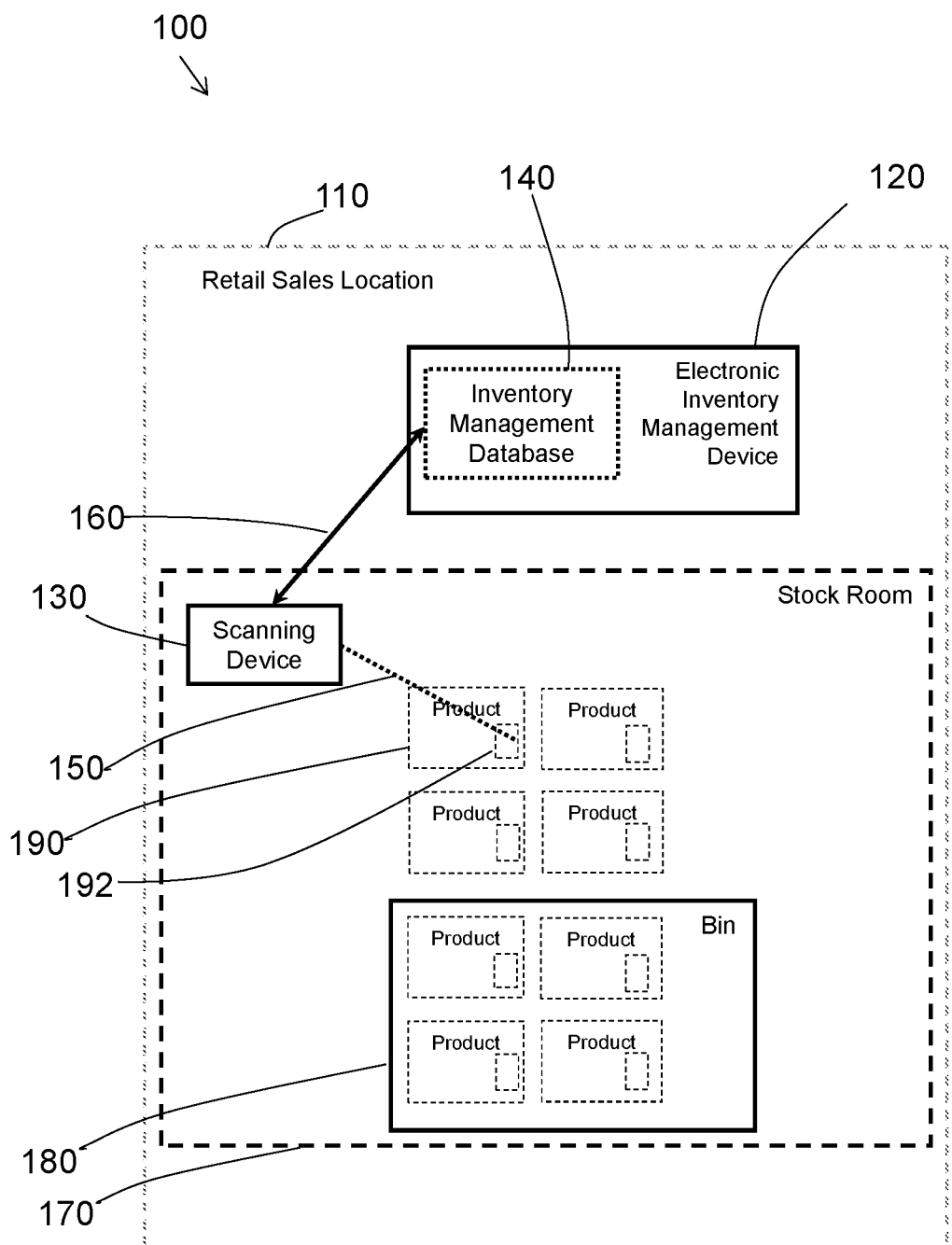
FIG. 1 is a diagram of a system of prioritizing retrieval of products from stock room bins at a retail sales facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, this application describes systems and methods of prioritizing retrieval of products from stock room bins at a retail sales facility. In particular, after a product is scanned during binning, the product is identified and a time stamp of binning is generated, after which the size of the product and the bin where the product is binned are determined. Then, the products in the bin are ranked based on the binning time stamp and the physical size of the product and the ranking of the product are correlated to the size of the bin to determine the relative physical locations of the products in the bin, after which a pick of a product from the bin is generated based on a determination that the location of the product to be picked in one of the bins is higher than a location of at least one identical product in at least another one of the bins.

In one embodiment, a method of prioritizing retrieval of products from a plurality of bins at a retail sales facility includes: receiving, at an electronic inventory management device including a processor, an identification obtained by a scanning device of at least one product being binned and a time stamp of a time of binning of the at least one product into at least one of the bins; determining, using the electronic inventory management device, a size of the at least one product based on the received identification; ranking, using the electronic inventory management device, the at least one product in the at least one of the bins based on the time stamp of a time of binning of the at least one product; correlating, using the electronic inventory management device, the physical size of the at least one product and the ranking of the at least one product to a size of the at least one of the bins; determining, using the electronic inventory management device, based on the correlating step, a physical location of the at least one product in the at least one of the bins relative to a physical location of other products stored in the at least one of the bins; and generating, using the electronic inventory management device, a pick of the at least one product from the at least one bin based on a determination by the electronic inventory management device that the physical location of the at least one product in the at least one of the bins is higher than a physical location of at least one identical product in at least another one of the bins.

In another embodiment, a system for prioritizing retrieval of products from a plurality of bins at a retail sales facility includes a reader configured to scan the products at the retail sales facility and an electronic inventory management device including a control unit having a processor in communication with the reader. The control unit is configured to: receive an identification obtained by the reader of at least one product being binned and a time stamp of a time of binning of the at least one product into at least one of the bins; determine a size of the at least one product based on the received identification; rank the at least one product in the at least one of the bins based on the time stamp of a time of binning of the at least one product; correlate the physical size of the at least one product and the ranking of the at least one product to a size of the at least one of the bins; determine, based on the correlation, a physical location of the at least one product in the at least one of the bins relative to a physical location of other products stored in the at least one of the bins; and generate a pick of the at least one product from the at least one bin based on a determination by the control unit that the physical location of the at least one product in the at least one of the bins is higher than a physical location of at least one identical product in at least another one of the bins.

In yet another embodiment, a system for prioritizing retrieval of products from a plurality of bins at a retail sales facility includes: means for receiving, at an electronic inventory management device including a processor, an identification obtained by a scanning device of at least one product being binned and a time stamp of a time of binning of the at least one product into at least one of the bins; means for determining, using the electronic inventory management device, a size of the at least one product based on the received identification; means for ranking, using the electronic inventory management device, the at least one product in the at least one of the bins based on the time stamp of a time of binning of the at least one product; means for correlating, using the electronic inventory management device, the physical size of the at least one product and the ranking of the at least one product to a size of the at least one of the bins; means for determining, using the electronic inventory management device, based on the correlating step, a physical location of the at least one product in the at least one of the bins relative to a physical location of other products stored in the at least one of the bins; and means for generating, using the electronic inventory management device, a pick of the at least one product from the at least one bin based on a determination by the electronic inventory management device that the physical location of the at least one product in the at least one of the bins is higher than a physical location of at least one identical product in at least another one of the bins.

Referring to FIG. 1, one embodiment of a system 100 for prioritizing retrieval of products 190 from a storage bin 180 at a stock room 170 of a retail sales facility 110 is shown. The retail sales facility 110 may be any place of business such as a store or warehouse where consumer products are stocked and/or sold. While only one storage bin 180 is shown in FIG. 1 for ease of illustration, it will be appreciated that the stock room 170 of the retail sales facility 110 may store numerous (e.g., tens, hundreds, and/or thousands) of bins 180.

The system 100 includes an electronic inventory management device 120 configured to manage the inventory of products 190 at the retail sales facility 110. The electronic inventory management device 120 illustrated in FIG. 1 may be a stationary or portable (e.g., hand-held) electronic device including a processor-based control unit, for example, a desktop computer, a laptop computer, a tablet, a mobile phone, or any other electronic device configured for data entry and one-way and/or two-way communication with another device located at the retail sales facility 110 (e.g., scanning device 130), or at a location remote to the retail sales facility 110 (e.g., a regional server configured for two-way communication with multiple retail sales facilities 110).

The exemplary electronic inventory management device 120 shown in FIG. 1 includes an inventory management database 140 configured to store electronic information regarding the products 190 at the retail sales facility 110. The inventory management database 140 may be stored, for example, on non-volatile storage media (e.g., a hard drive, flash drive, or removable optical disk) internal or external relative to the electronic inventory management device 120, or internal or external to computing devices (e.g., remote server) separate from the electronic inventory management device 120.

In some embodiments, the inventory management database 140 may store electronic data associated with the products 190 at the retail sales facility 110 including but not limited to: identification data (e.g., label information, tag information, a barcode information, radio frequency identification (RFID), or the like) for the products 190; and/or physical attribute data for the products 190 (e.g., height, weight, length, width, weight, or the like); and/or shelf life data (e.g., expiration date) of the product 190; and/or storage conditions data for the products 190 (ambient temperature, refrigeration, frozen, or the like.). The electronic data stored in the inventory management database 140 may be received by the electronic inventory management device 120, for example, as a result of a user (e.g., stock room associate) scanning the products 190 using the scanning device 130. Of course, at least some of the electronic data may be transmitted to the inventory management database 140 from a remote server. By way of example, information regarding physical size and/or expiration date of the products 190 may be received from a server located at a regional product distribution center, or directly from a product manufacturer's server.

It will be appreciated that while FIG. 1 shows that the scanning device 130 scans products 190 located in the stock room 170 and outside of the storage bin 180, the scanning device 130 may be used to scan the products 190 located within the storage bin 180, or anywhere at the retail sales facility 110, such that the inventory management database 140 may contain electronic information regarding the products 190 scanned outside of the stock room 170 (e.g., on the sales floor, product loading/unloading area, and/or stocking cart). It will be appreciated that the inventory management database 140 does not have to be incorporated into the electronic inventory management device 120 at the retail sales facility 110, but may be stored on a remote (e.g., regional) server in communication with the electronic inventory management device 120.

The scanning device 130 may be an electronic mobile (e.g., hand-held) scanner that may be carried by a worker at the retail sales facility 110. Examples of such scanning devices 130 may include, but are not limited to barcode, RFID, or SKU readers, cellular phones, and/or electronic tablets). Alternatively, the scanning device 130 may be a stationary electronic scanning device installed in the stock room 170 of the retail sales facility 110. In the exemplary embodiment illustrated in FIG. 1, the scanning device 130 may obtain electronic data providing for an identification of the product 190 by communicating via a communication pathway 150 (e.g., radio waves) with an identifying indicia 192 (e.g., barcode, RFID, or SKU number) of the product 190. The electronic inventory management device 120 shown in FIG. 1 may receive the electronic identification data associated with the product 190 from the scanning device 130 by way of a two-way communication channel 160, which may be a wired or wireless connection (e.g., WiFi).

Figure 2:
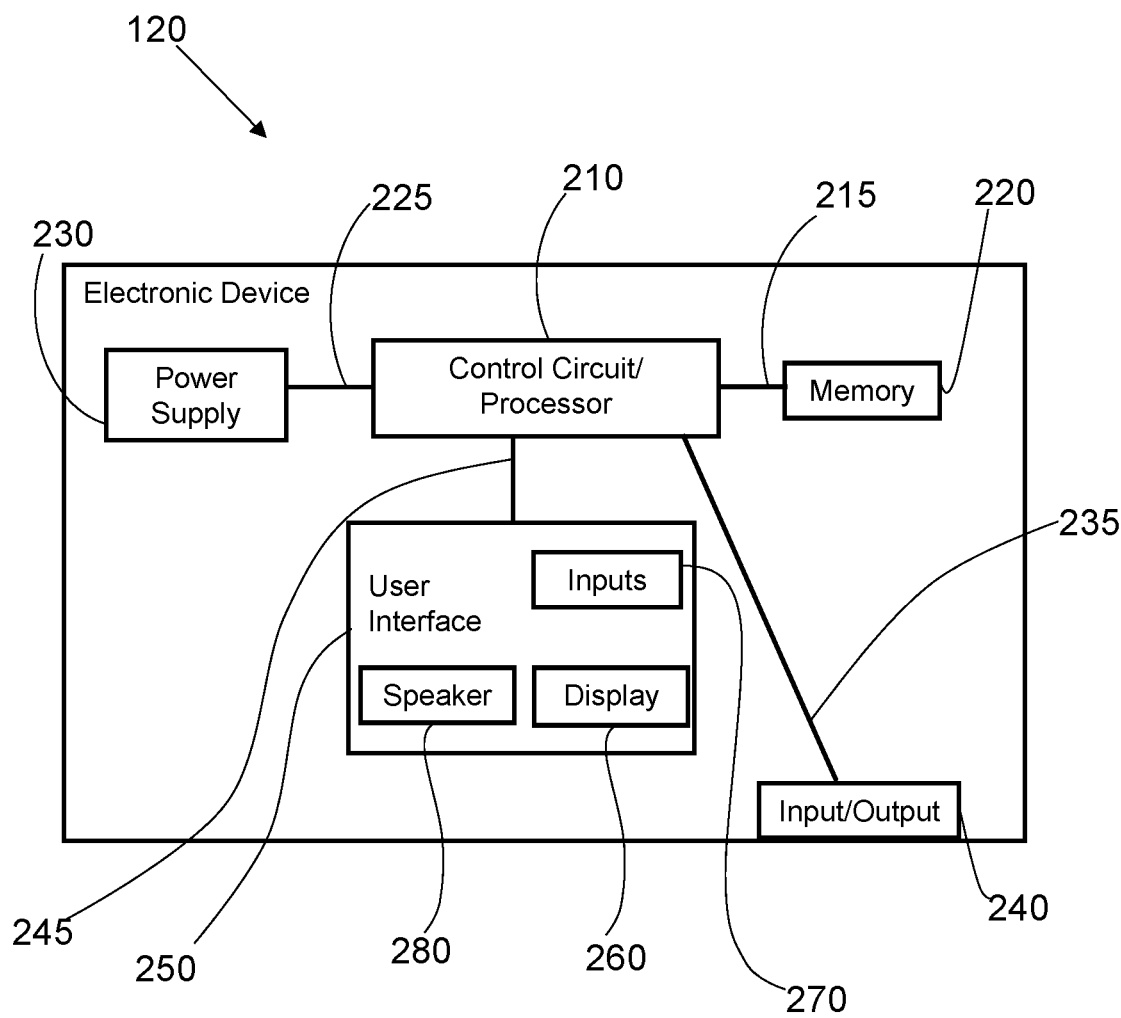
FIG. 2 is a functional diagram of an electronic inventory management device in accordance with several embodiments.

An exemplary electronic inventory management device 120 depicted in FIG. 2 is a computer-based device and includes a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)). Accordingly, the memory and/or the control circuit may be referred to as a non-transitory medium or non-transitory computer readable medium. The control circuit 210 of the electronic inventory management device 120 is also electrically coupled via a connection 235 to an input/output 240 that can receive signals from and send signals (via a wired or wireless connection) to (e.g., commands, inventory database information), for example, devices local to the retail sales facility 110, or one or more servers remote to the retail sales facility 110.

Optionally, instead of receiving information regarding the products 190 from a separate scanner such as the scanning device 130, the control circuit 210 may also be electrically coupled to a sensor such as a reader configured to detect and/or read information on the identifying indicia (e.g., visual label or indicator) 192 located on the products 190 when the electronic inventory management device 120 is placed in direct proximity to a product 190. Such an optional reader may be a radio frequency identification (RFID) reader, an optical reader, a barcode reader, or the like.

In the embodiment shown in FIG. 2, the control circuit (i.e., control unit) 210 of the electronic inventory management device 120 is electrically coupled via a connection 245 to a user interface 250, which may include a visual display or display screen 260 (e.g., LED screen) and/or button input 270 that provide the user interface 250 with the ability to permit a user such as a stock room or sales floor associate at the retail sales facility 110 to manually control the electronic inventory management device 120 by inputting commands, for example, via touch-screen and/or button operation or voice commands. The display screen 260 can also permit the user to see various menus, options, and/or alerts displayed by the electronic inventory management device 120. The user interface 250 of the electronic inventory management device 120 may also include a speaker 280 that may provide audible feedback (e.g., alerts) to the user.

With reference to FIGS. 1-3, one method 300 of operation of the system 100 in order to prioritize the retrieval of products 190 from bins 180 at the retail sales facility 110 will now be described. For exemplary purposes, the method 300 is described in the context of the system of FIG. 1, but it is understood that embodiments of the method 300 may be implemented in the system 100 or other systems. Generally, as shown in FIG. 3, the method 300 includes receiving, at the electronic inventory management device 120, an identification of one or more products 190 being binned in a stock room 170 of the retail sales facility 110, and a time stamp of a time of binning of the product 190 into the bin 180 (step 310). As described above, in the exemplary embodiment illustrated in FIG. 1, the identification of the product 190 can be electronic data that may uniquely identify the product 190 or its physical attributes, the time of arrival of the product 190 to the retail sales facility, and/or the time of binning of the product 190 into a bin 180. Such electronic data may be obtained when a worker at the retail sales facility 110 scans the identifying indicia 192 (e.g., barcode, RFID, or the like) of the product 190 in the stock room 180 using the scanning device 130 (e.g., mobile scanner). The identification data obtained by scanning device 130 may be transmitted to the electronic inventory management device 120 by way of a one-way or two-way communication channel 160 (e.g., WiFi). It will be appreciated that instead of the electronic inventory management device 120 receiving a signal including identification data pertaining to the products 190 from the scanning device 130, the identification data pertaining to the products 190 may be manually entered by a worker (e.g., stocking associate) at the retail sales facility 110 into the electronic inventory management device 120.

In some embodiments, in response to the stocking associate at the retail sales facility 110 scanning a product 190 using the scanning device 130, and the scanning device 130 transmitting a signal including an identification of the product 190 to the electronic inventory management device 120, the processor of the control circuit 210 of the electronic inventory management device 120 is programmed to send an appropriate signal to the inventory management database 140 internal to the electronic inventory management device 120 to update the inventory management device 140 with the identification of the product 190. It will be appreciated that instead of transmitting the identifying data for the product 190 to the electronic inventory management device 120 directly, the scanning device 130 may transmit the identifying data for the product 190 to a remote inventory management database located at a server remote to the retail sales facility 110.

In the exemplary method 300 illustrated in FIG. 3, the control circuit 210 of the electronic inventory management device 120 is programmed to determine the size of the scanned product 190 based on the received identification data for the product (step 320). The physical size of the product 190 may be determined by retrieving size data for the product 190 from the inventory management database 140, or may be obtained by the electronic inventory management device 120 from a server remote to the electronic inventory management device 120 (e.g., regional server, product manufacturer server, or the like).

In the exemplary embodiment of FIG. 3, the processor of the control circuit 210 of the electronic inventory management device 120 is programmed to rank the products 190 in the bin 180 based on the time stamp of a time of binning of the products 190 (step 330). In some embodiments and as will be described in more detail below, a time stamp of placement of a product 190 into a bin 180 (i.e., binning) is generated when the identifying indicia 192 of the product 190 is scanned (e.g., by the scanning device 130) at the time when the product 190 is binned. The processor of the control circuit 210 of the electronic inventory management device 120 is programmed to rank the products based on the time stamp of binning of the products 190 stored in the bins 180. Generally, products 190 that are binned more recently than other products have a higher likelihood of being easily and quickly picked from a bin 180 than products that were less recently binned in that bin 180, and have higher likelihood of being difficult to pick, due to being located lower in the bin). As such, the ranking of the products 190 in the bin 180 based on their time stamp provides a basis for determining the locations of the products 190 in the bin 180 relative to one another. It will be appreciated that in some embodiments, the products 190 may not be scanned using the scanning device 130 in the sequential order as they are individually placed in the bin 180, but may be instead placed in the bin 190 first and then scanned while already in the bin 180 using the scanning device 130 from top to bottom of the bin 180. In some of such embodiments the system 100 may be set up such that the time stamp generated in response to the scanning of the product 190 represents a time of binning (not scanning) of the product 190, and the processor of the control circuit 210 of the electronic inventory management device 120 is programmed to interpret the products 190 having the latest time stamps as being physically located near the top of the bin 180. Alternatively, in other such embodiments, the system 100 may be set up such that the time stamp generated in response to the scanning of the product 190 represents a time of scanning (not binning) of the product 190, and the processor of the control circuit 210 of the electronic inventory management device 120 is programmed to interpret the products 190 having the latest time stamps as being physically located near the bottom of the bin 180.

In the exemplary embodiment of FIG. 3, after the products 190 are ranked based on their time stamps of binning, the processor of the control circuit 210 of the electronic inventory management device 120 is programmed to correlate the physical size of the product 190 and the ranking of the product 190 to a size of the bin 180 (step 340). In some embodiments, the processor of the control circuit 210 of the electronic inventory management device 120 is programmed to determine the size of the bin 180 by retrieving (e.g., from the inventory management database 140) data indicating the number of products 190 in the bin 180 and the physical size of each of the products 190 in the bin 180. More specifically, in some embodiments, the processor of the control circuit 210 of the electronic inventory management device 120 is programmed to determine the size of the bin 180 by retrieving data indicating the largest number of products 190 stored in the bin 180 at one time and the physical size of the products 190 stored in the bin 180 when the largest number of products 190 is present in the bin 180. In some embodiments, electronic data indicating the physical sizes of the bins 180 in the stock room 170 may be stored on the inventory management database 140, for example, as a result of a stocking associate manually entering the data into the electronic inventory management device 120, or by other means.

After the physical size of the product 190 and the ranking of the product 190 are correlated to the physical size of the bin 180, the processor of the control circuit 210 of the electronic inventory management device 120 is programmed to determine, based on the correlating step, a physical location of the products 190 in the bin 180 relative to a physical location of other products 190 stored in the bin 180 (step 350). In some embodiments, in addition to being programmed to determine a physical location of the products 190 in the bin 180 relative to the physical location of the other products 190 in the same bin 180, the processor of the control circuit 210 of the electronic inventory management device 120 is programmed to determine the physical location of the products 190 in a first bin 180 relative to a physical location of at least one product 190 in a second bin 180. In the exemplary embodiment of FIG. 3, after the physical location of the product 190 relative to other products 190 in the bin 180 is determined, the processor of the control circuit 210 of the electronic inventory management device 120 is programmed to generate a pick of the product 190 from the bin 180, based on a determination by the control unit 210 of the electronic inventory management device 120 that the physical location of the product 190 (to be picked) in the bin 180 is higher than a physical location of at least one identical product 190 in another bin 180 (step 360).

In some embodiments, the processor of the control unit 210 of the electronic inventory management device 120 is programmed, in addition to generating a pick for a particular product 190, to identify a specific bin 180 where the product 190 for which the pick is generated is stored. For example, a bin 180 may be identified by way of a unique number associated with the bin 180. In one exemplary approach, the processor of the control unit 210 of the electronic inventory management device 120 is programmed, in addition to generating a pick for a particular product 190, to identify a specific location (i.e., isle, shelf, etc.) of the bin 180 in the stock room 170, thereby facilitating the stock room associate in quickly locating the bin 180 and retrieving from the specified bin 180 the product 190 for which the pick was generated.

Some of the products 190 delivered to the retail sales facility 110 may have an expiration date, and retrieval of such products 190 from the bins 180 in the stock room 170 may need to be prioritized in order to reduce the chances that a product having an upcoming expiration date remains in a storage bin while another, identical product having an expiration date a week later is picked from another (or the same bin) and taken to the sales floor. In some embodiments, after the product 190 is scanned in the stock room 170 of the retail sales facility 110 using the scanning device 130, the inventory management database 140 may obtain electronic data indicating that the scanned product 190 has an expiration date. It will be appreciated that the data pertaining to an expiration date of a scanned product 190 may be obtained from the inventory management database 140 of the electronic inventory management device 120, or from a remote location (e.g., regional server), where expiration date data for the products 190 delivered to the retail sales facility 110 may be stored.

In some embodiments, for products 190 that have expiration dates, the processor of the control unit 210 of the electronic inventory management device 120 is programmed to determine (e.g., after querying the inventory management database 140) that the product 190 having an expiration date has a time stamp of a time of binning that is older than a time stamp of a time of binning of at least one identical product 190 in one or more other bins 180. Upon such a determination, the control unit 210 of the electronic inventory management device 120 is programmed to generate a pick from the bin 180 of the product 190 having the older time stamp of the time of binning. Since the earlier-binned products are more likely to have a sooner expiration date than the later-binned product, the generation of a pick for the product having the older binning time stamp advantageously facilitates the products 190 likely having a more immediate expiration date to be picked from the bin 180 before the products 190 having later expiration dates.

In some embodiments, the electronic inventory management device 120 receives a time stamp of a time of delivery of one or more products 190 to the retail sales facility 110. For example, a time stamp of a time of delivery of a product 190 may be generated when a worker at the retail sales facility 110 initially scans the product 190 delivered to the retail sales facility 110. For products 190 that have expiration dates, the control unit 210 of the electronic inventory management device 120 is programmed to determine (e.g., after querying the inventory management database 140) that the product 190 having an expiration date has a time stamp of a delivery of the product 190 to the retail sales facility 110 that is older than a time stamp of a time of delivery of at least one identical product 190 in one or more other bins 180. Upon such a determination, the control unit 210 of the electronic inventory management device 120 is programmed to generate a pick from the bin 180 of the product 190 having the older time stamp of the time of delivery to the retail sales facility 110. Since the earlier-delivered products are more likely to have a sooner expiration date than the later-binned product, the generation of a pick for the product having the older delivery time stamp advantageously facilitates the products 190 likely having a more immediate expiration date to be picked from the bin 180 before the products 190 having later expiration dates.

FIG. 4 shows an exemplary method 400 in operation. Here, identification data for products 190a-h received at the retail sales facility 110 is entered into the electronic inventory management device 120 as a result of the binning of the products 190, where the identifying indicia 192 of the products 190a-h is scanned by a worker at the retail sales facility 110 using the scanning device 130 (step 410). As discussed above, such a scan may be performed in the stock room 170 of the retail sales facility 110 using the scanning device 130, and the scanning device 130 may transmit to the electronic inventory management device 120 the electronic data indicating an identification for each of the items 190a-190h and a time stamp of binning of each item 190a-190h. As discussed above, the identification of the products 190a-190h permits the electronic inventory management device 120 to determine a physical size of each of the products 190a-190h.

In the exemplary embodiments of FIGS. 1 and 4, after the products 190a-h are binned (step 420), each of the products 190a-h has a unique time stamp of binning stored in the inventory management database 140 of the electronic inventory management device 120. In the example shown in FIG. 4, in bin 180a, the product 190a was binned first and has the oldest time stamp, product 190b was binned second and has a newer time stamp, product 190c was binned third and has a still newer time stamp, and product 190d was binned last and has the newest stamp. In bin 180b, the product 190e was binned first and has the oldest time stamp, product 190f was binned second and has a newer time stamp, product 190g was binned third and has a still newer time stamp, and product 190h was binned last and has the newest stamp.

In the embodiment of FIGS. 1 and 4, the time stamps of binning of each of the products 180a-180h may be stored in the inventory management database 140 of the electronic inventory management device 120, and the processor of the control unit 210 of the electronic inventory management device 120 is programmed to rank the products 190a-190h in their respective bins 180a and 180b based on their time stamps, and to correlate the ranking of the time stamps of the products 190a-h to the physical sizes of the products 190a-190h. This correlation, combined with the known sizes of each of the bins 180a and 180b, the data identifying which is stored in the inventory management database 140, permits the processor of the control unit 210 of the electronic inventory management device 120 to determine the relative location of the products 190a-190h in their respective bins 180a and 180b.

Generally, in order to make a determination regarding the relative location of the products 190a-190h in their respective bins 180a and 180b requires the control unit 210 of the electronic inventory management device 120 to determine where (i.e., a physical location) the products 190a-190h in their respective bins 180a and 180b. In some embodiments, the control unit 210 of the electronic inventory management device 120 is programmed to factor in the known physical size of the bins 180a and 180b and factor in the known physical size of the products 190a-190h. In one approach, the physical sizes and storage capacities of the bins 180a and 180b as well as the physical sizes of the products 190a-190h are stored in the inventory management database 140 in some embodiments, and the control unit 210 of the electronic inventory management device 120 is programmed to obtain the physical sizes of the products 190a-190h and the storage capacities of the bins 180a and 180b from the inventory management database 140. For example, when the control unit 210 of the electronic inventory management device 120, based on the data obtained from the inventory management database 140, determines that the bins 180a and 180b are 4 feet by 3 feet, the control circuit 210 is programmed to calculate that each of the bins 180a and 180b has 12 square feet of space therein.

In an exemplary situation when the physical size of the identical products 190a-190h obtained by the control circuit 210 from the inventory management database 140 is 1 foot by 1 foot by 1 foot, the control circuit 210 is programmed to calculate that each of the bins 180a and 180b, which has 12 square feet of storage space, contains 12 of such products 190a-190h. When attempting to determine which one of the products 190a-190h should be picked from the bins 180a and 180b, the control unit 210 of the electronic inventory management device 120 is programmed to obtain the time stamps of binning of the products 190a-190h from the inventory management database 140. In some embodiments, the control unit 210 of the electronic inventory management device 120 is programmed to assume that the products 190a-190h are put in each of the bins 180a and 180b along the bottom first and then stacked.

In the example where the bin 180a has 12 square feet of interior space and stores 12 identical 1 square foot products 190a-190h therein, the control unit 210 of the electronic inventory management device 120 is programmed to determine that a product 190*f* that was binned 6*th* (based on the time stamp) is located in the second row up and second column, and would require the worker to move one product stacked above it in order for the worker to pick the product 190*f*. In some embodiments, the control unit 210 of the electronic inventory management device 120 is programmed to take into account all of the products 190*a*-190*h* located in all of the bins 180*a*-180*b*. If, for example, the control unit 210 of the electronic inventory management device 120 determines, based on the above-discussed analysis, that a pick of the product 190*f* would require removal one product 190*g* (stacked on top of the product 190*f*) from the bin 180*b*, while a pick of the product 190*b* would require removal of two products 190*a* and 190*b* (stacked on top of the product 190*b*) from the bin 180*a*, the control unit 210 of the electronic inventory management device 120, which is programmed to determine which one of the products 190*b* and 190*f* is located such that it requires less effort to be taken out of its respective bin 180*a* and 180*b*, the control unit 210 of the electronic inventory management device 120 would generate a determination (and transmit an appropriate notification) that the product 190*f* should be picked from the bin 180*b* by the worker.

In the example shown in FIG. 4, since the product 190*a* in bin 180*a* is known by the processor of the control unit 210 of the electronic inventory management device 120 to be identical to the products 190*f* and 190*g* in bin 180*b*, once the relative physical locations of the products 190*a*-190*h* are determined by the processor of the control unit 210 of the electronic inventory management device 120, the processor of the control unit 210 of the electronic inventory management device 120 generates a pick of the product 190*g* from bin 180*b* based on a determination by the processor of the control unit 210 of the electronic inventory management device 120 that the physical location of product 190*g* is higher in the bin 180*b* than the physical location of the identical product 190*a* in bin 180*b* and higher than the physical location of the identical product 190*f* in bin 180*b*. The generated pick of the product 190*g* facilitates an easier retrieval of the product 190*g* from the bins 180*a* and 180*b*, since the product 190*g* is located higher in bin 180*b* compared to the product 190*f* in bin 180*b* and relatively higher in its respective bin 180*b* as compared to the product 190*a* in bin 180*a*.

The systems and methods described herein provide for efficient retrieval of products from storage bins in stock rooms of retail sales facilities. The ranking of the products in the bins based on their time stamps (e.g., time of binning and/or time of delivery) and the determination of the relative locations of identical products in the bins (e.g., based on the known sizes of both the products and the bins) advantageously permits the system to generate picks for the most easily accessible products in the stock room, thereby improving the efficiency of stock room associates in retrieving the products. In addition, the generation of picks as described herein advantageously facilitates the cycling of perishable products in the stock room by generating picks for perishable products that are likely to have an earlier upcoming expiration date.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of prioritizing retrieval of products from a plurality of bins at a retail sales facility, the method comprising:

providing an inventory management database configured to store electronic information associated with the products located at the retail sales facility, the electronic information associated with the products located at the retail sales facility including at least one of bin identifier data uniquely identifying each one of the bins, bin size data, product identity data, product physical attribute data, and product shelf life data;

scanning, via an electronic scanning device of a worker at the retail sales facility, at least one product being placed into at least one of the bins at the retail sales facility to obtain identification data associated with the at least one product, the scanning including generating, via the electronic scanning device, at least one electronic time stamp indicating a time when the at least one product was scanned by the electronic scanning device during placement of the at least one product into the at least one of the bins;

receiving, at an electronic inventory management device including a processor, and from the electronic scanning device, a signal including the identification data associated with the at least one product obtained by the electronic scanning device and the at least one electronic time stamp indicating the time when the at least one product was scanned by the electronic scanning device during placement of the at least one product into the at least one of the bins;

in response to the receiving step, obtaining, via the electronic inventory management device and from the inventory management database, the product identity data and the product physical attribute data and the bin size data;

generating, via the processor of the electronic inventory management device and based on analyzing, via the processor, the product identity data and the product physical attribute data and the bin size data obtained via the electronic inventory management device from the inventory management database, size data representing a size of the at least one product and a size of the at least one of the bins;

generating, via the processor of the electronic inventory management device, ranking data representing a ranking of the at least one electronic time stamp associated with the at least one product placed into the at least one of the bins;

correlating, via the processor of the electronic inventory management device, the size data representing the size of the at least one product determined by the processor and the ranking data representing the ranking of the at least one electronic time stamp associated with the at least one product generated by the processor to the size data associated with the at least one of the bins determined by the processor;

based on the correlating step:

determining, via the processor of the electronic inventory management device, a physical location of the at least one product in the at least one of the bins relative to a physical location of other products stored in the at least one of the bins;

based on a determination by the processor of the electronic inventory management device that the physical location of the at least one product in the at least one of the bins is higher than a physical location of at least one identical product in at least another one of the bins, generating, via the processor of the electronic inventory management device, a pick instruction indicating that the at least one product is to be picked from the at least one of the bins; and transmitting an electronic signal including the pick instruction from the electronic inventory management device to the electronic scanning device of the worker at the retail sales facility, by the electronic scanning device of the worker and in response to receipt of the electronic signal from the electronic inventory management device:

generating, on a display or via a speaker of the electronic scanning device of the worker, a visible or audible output, the visible or audible output indicating to the worker:

the pick instruction to the worker to pick, from the at least one bin, the at least one product for which the pick instruction was generated by the processor; and the bin identifier data uniquely identifying to the worker the at least one bin from which the at least one product is to be picked according to the pick instruction.

2. The method of claim 1, wherein the electronic scanning device is one of a mobile hand-held scanner and a stationary scanner, and wherein the receiving step including scanning the at least one product using one of the mobile hand-held scanner and the stationary scanner at a time when the at least one product was scanned by the electronic scanning device during placement of the at least one product into the at least one of the bins.

3. The method of claim 2, wherein the scanning of the at least one product includes scanning the at least one product using at least one of a radio frequency identification (RFID) reader, an optical reader, and a barcode reader.

4. The method of claim 1, wherein the receiving step further includes receiving, by the electronic inventory management device, electronic data indicating that the at least one product has an expiration date.

5. The method of claim 4, wherein the generating step further includes generating, using the electronic inventory management device, a pick instruction for the at least one product having an expiration date from the at least one bin based on a determination by the electronic inventory management device that the at least one product having an expiration date was placed into the at least one of the bins before at least one product that is identical to the at least one product having an expiration date and that was placed into at least another one of the bins.

6. The method of claim 4, wherein the receiving of an indication that the at least one product has an expiration date further includes receiving, using the electronic inventory management device, a time stamp of a time of delivery of the at least one product to the retail sales facility.

7. The method of claim 6, wherein the generating step further includes generating, using the electronic inventory management device, a pick instruction of the at least one product having an expiration date from the at least one bin based on a determination by the electronic inventory management device that the at least one product having an expiration date was delivered to the retail facility before at least one product that is identical to the at least one product having an expiration date and that is located in at least another one of the bins.

8. The method of claim 1, wherein the determining a physical location of the at least one product in the at least one of the bins relative to a physical location of other products stored in the at least one of the bins step further includes determining the physical location of the at least one product in the at least one of the bins relative to the physical location of at least one other product in the at least one of the bins.

9. The method of claim 8, wherein the generating step further includes indicating a stock room location of the at least one bin including the at least one product for which the pick instruction is generated.

10. The method of claim 1, wherein at least one of the steps of receiving, ranking, determining, correlating, determining, and generating includes one of transmitting data from the electronic inventory management device to and receiving data from a server in communication with the electronic inventory management device.

\* \* \* \* \*